(Model.)

J. G. PERRY.
Snap Hook.

No. 238,710.             Patented March 8, 1881.

Witnesses:
T. H. Gardner
Benj. W. Palmer

Inventor:
John G. Perry

UNITED STATES PATENT OFFICE.

JOHN G. PERRY, OF WAKEFIELD, RHODE ISLAND.

SNAP-HOOK.

SPECIFICATION forming part of Letters Patent No. 238,710, dated March 8, 1881.

Application filed June 18, 1880. (Model.)

*To all whom it may concern:*

Be it known that I, JOHN G. PERRY, of Wakefield, in the county of Washington and State of Rhode Island, have invented certain new and useful Improvements in Snap-Hooks, of which the following is a specification, reference being had to the accompanying drawings, making part thereof, and of which—

Figure 3:
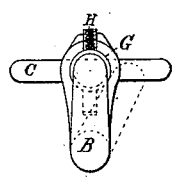
Figure 1:
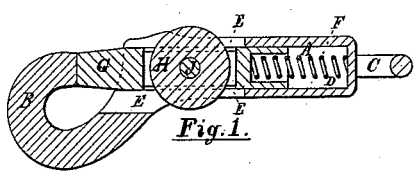
Figure 4:
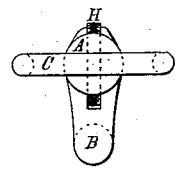
Figure 2:
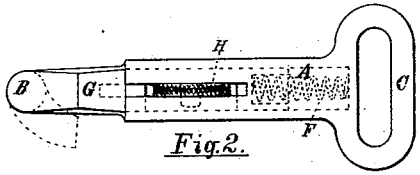
Figure 5:
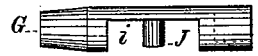
Figure 6:
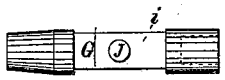
Figure 7:
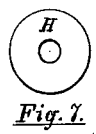
Figure 9:
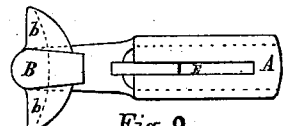
Figure 8:
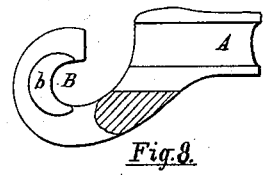

Figure 1 is a longitudinal section; Fig. 2, a plan view; Fig. 3, an end view of the hook; Fig. 4, an end view of the loop or rear of the hook; Fig. 5, plan view of bolt, showing the stud and recess; Fig. 6, a side view of bolt, showing the stud and recess; Fig. 7, the wheel with milled or roughened edge; Fig. 8, side of hook with lips; Fig. 9, plan of same with lips.

The great trouble heretofore experienced and complained of in relation to the snap-hooks now in the market is their liability of being accidentally unhooked by the restlessness of animals and their getting away.

The object of this improvement is to obviate this trouble, and also to prevent wear to the rings, &c., to which it is attached when used on driving-reins, &c., and its construction is as hereinafter more fully described.

A represents the tubular shank, B the hook, and C the loop, all cast or made in one piece of malleable iron or any suitable material, with said hook molded at one side, as represented by the dotted lines in Figs. 2 and 3, for the purpose hereinafter more fully shown. Said shank has a tubular cavity, D, made by means of a core or otherwise nearly of its entire length, with slots E E for the reception of the spring F, bolt G, and wheel H. Said bolt is constructed with a recess, $i$, and a pivoting-stud, J, projecting from the bottom of said recess, as shown in Figs. 1, 5, and 6 of the drawings, for the reception of said wheel H, which is pivoted on said stud.

The shank A being made of malleable iron, with the hook cast at one side to allow the bolt and wheel and spring to pass in, said spring, bolt, and wheel are dropped into place, and said hook then bent or twisted in proper shape, which prevents the bolt from coming out, and keeps the spring, bolt, and wheel in position.

The slots E E are of sufficient length to admit of the lateral movements of wheel H, the periphery of which projects outside of said slots, and by means of which said bolt is moved in and out; and to move it inward for hitching or otherwise the snap-hook is taken in the hand with the wheel clasped between the thumb and finger, and the wheel moved bodily toward the loop C or rolled around by the thumb on one side bearing upon the finger on the other side, in the direction to move the bolt inward, compressing the spring, which, though simple and easy to operate by any person with one hand, are movements that could not possibly be made by the uneasiness of the animal, or in any way by accident, as anything operating upon one side of said wheel only would simply turn it around upon said stud J without moving said bolt, and renders this snap-hook perfectly safe and proof against the troubles complained of, while it is very simple, neat, durable, and cheap.

By making the hook with a broader bearing, $b\ b$, as in Figs. 8 and 9, the wear upon the bit-ring or other parts to which they are attached will be much less.

The periphery of wheel H may be made smooth, milled, or with teeth to prevent slipping in operating it; and instead of the wheel, a section of it, or a bar pivoted in its place to the bolt and extending through the slots, may be used with the same effect.

Having thus described my improvements in snap-hooks, what I claim, and desire to secure by Letters Patent, is—

1. The improved snap-hook described, consisting of the tubular slotted shank A, hook B, and loop C, in combination with the spring F, bolt G, and pivoted retractor H, adapted to operate substantially as and for the purposes herein set forth.

2. A snap-hook having a spring-pressed bolt provided with a rotary wheel, whereby said bolt may be retracted by grasping the wheel on opposite sides of its pivot, substantially as and for the purposes herein specified.

JOHN G. PERRY.

Witnesses:
T. A. GARDNER,
BENJ. W. PALMER.